(12) United States Patent
Miyawaki et al.

(10) Patent No.: US 12,083,939 B2
(45) Date of Patent: Sep. 10, 2024

(54) CONVEYANCE SEAT

(71) Applicant: TS TECH CO., LTD., Asaka (JP)

(72) Inventors: Kazuya Miyawaki, Tochigi (JP); Satoshi Fujita, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 91 days.

(21) Appl. No.: 17/911,805

(22) PCT Filed: Mar. 18, 2021

(86) PCT No.: PCT/JP2021/011207
§ 371 (c)(1),
(2) Date: Sep. 15, 2022

(87) PCT Pub. No.: WO2021/187596
PCT Pub. Date: Sep. 23, 2021

(65) Prior Publication Data
US 2023/0144452 A1    May 11, 2023

(30) Foreign Application Priority Data

Mar. 19, 2020 (JP) ................................ 2020-049859

(51) Int. Cl.
*B60N 2/64* (2006.01)
*B60N 2/58* (2006.01)
*B60N 2/68* (2006.01)

(52) U.S. Cl.
CPC ............. *B60N 2/64* (2013.01); *B60N 2/5825* (2013.01); *B60N 2/68* (2013.01)

(58) Field of Classification Search
CPC ........ B60N 2/64; B60N 2/643; B60N 2/5825; B60N 2/5816; B60N 2/68
See application file for complete search history.

(56) References Cited

U.S. PATENT DOCUMENTS 8,231,174 B2 * 7/2012 Yamada ................... B60N 2/30
297/284.11
8,752,861 B2 * 6/2014 Fukawatase ........... B60N 2/986
280/730.2
(Continued)

FOREIGN PATENT DOCUMENTS

JP    2001-146127    5/2001
JP    2013-249066    12/2013
(Continued)

OTHER PUBLICATIONS

PCT International Search Report and Written Opinion (w/ English translation) for corresponding PCT Application No. PCT/JP2021/011207, mailed on Jun. 8, 2021, 10 pages.

*Primary Examiner* — Philip F Gabler
(74) *Attorney, Agent, or Firm* — Dority & Manning, P.A.

(57) ABSTRACT

Provided is a conveyance seat having a good seating feeling and a suitable shock absorbing structure at the time of a rear collision. A conveyance seat has a configuration in which a cushion material is placed on a back frame and is covered with a skin material. The back frame includes right and left side frames which constitute side portions in a seat width direction and extend in an up to down direction. A surface of a cushion front portion disposed on a seat front side of the back frame in the cushion material is provided with a skin pull-in groove for pulling an end of the skin material and a surface groove disposed on the outside of the skin pull-in groove in the seat width direction and extending in the up to down direction. A back surface of the cushion front portion is provided with a back surface groove which is disposed between the skin pull-in groove and the surface groove in the seat width direction and extends in the up to down direction. The surface groove is disposed at a position overlapping the side frame in the front to back direction of the seat.

7 Claims, 7 Drawing Sheets

(56) References Cited

U.S. PATENT DOCUMENTS

| | | | |
|---|---|---|---|
| 8,979,204 B2* | 3/2015 | Awata | B60N 2/72 |
| | | | 297/452.59 |
| 9,409,506 B2* | 8/2016 | Sahashi | B60N 2/5816 |
| 9,598,040 B2* | 3/2017 | Tanabe | B60N 2/68 |
| 2006/0163850 A1* | 7/2006 | Inazu | B60N 2/5825 |
| | | | 280/730.2 |
| 2013/0175792 A1 | 7/2013 | Fukawatase et al. | |
| 2019/0225127 A1* | 7/2019 | Verde | B60N 2/5816 |

FOREIGN PATENT DOCUMENTS

| | | |
|---|---|---|
| JP | 2019-14448 | 1/2019 |
| KR | 10-2015-0050970 | 5/2015 |

\* cited by examiner

CONVEYANCE SEAT

CROSS REFERENCE TO RELATED APPLICATIONS

This application is the U.S. National Stage entry of International Application No. PCT/JP2021/011207 filed under the Patent Cooperation Treaty on Mar. 18, 2021, which claims priority to Japanese Patent Application No. 2020-049859 filed on Mar. 19, 2020, both of which are incorporated herein by reference.

TECHNICAL FIELD

The present invention relates to a conveyance seat and particularly to a conveyance seat having a configuration in which a cushion material is placed on a back frame serving as a skeleton of a backrest portion and is covered with a skin material.

BACKGROUND ART

Conventionally, there is known a vehicle seat configured to reduce a shock applied to a neck of an occupant by moving a head of the occupant toward a headrest in such a manner that an upper body of the occupant trying to move backward due to inertia at the time of a rear collision of a vehicle sinks into a seat back (for example, see PATENT LITERATURE 1).

In the vehicle seat described in PATENT LITERATURE 1, right and left side frames constituting side portions in a seat width direction, a connection wire connecting the right and left side frames, and an occupant support member (pressure receiving member) with a plate-shaped thin wall that is attached between the right and left side frames through the connection wire and supports a load from the occupant are provided as the back frame.

Since the occupant support member moves backward at the time of a rear collision of the vehicle, the upper body of the occupant sinks into the seat back by the occupant support member.

Further, in the vehicle seat, since the cushion material is placed on the back frame and is covered with a skin material, each of a front surface groove (skin pull-in groove) and a rear surface groove extending in an up to down direction is formed at a predetermined position not overlapping the back frame of the cushion material in a front to back direction of the seat. By the front surface groove and the back surface groove of the cushion material, the cushion material is easily bent so that the upper body of the occupant further easily sinks into the seat back at the time of a rear collision of the vehicle.

CITATION LIST

Patent Literature

PATENT LITERATURE 1: JP 2013-249066 A

SUMMARY OF INVENTION

Technical Problem

Incidentally, in the vehicle seat shown in PATENT LITERATURE 1, the seat back (cushion material) is configured to be easily bent so that the upper body of the occupant sinks into the seat back at the time of a rear collision of the vehicle.

However, it was required that the seated occupant has a comfortable seating feeling during normal use.

That is, it has been required to achieve both a good seating feeling (seating feeling) during normal use and a suitable shock absorbing structure at the time of a rear collision.

The present invention has been made in view of the above-described problems and an object of the present invention is to provide a conveyance seat having a good seating feeling during normal use and a suitable shock absorbing structure at the time of a rear collision.

Solution to Problem

According to the conveyance seat of the present invention, the above-described problems are solved by a conveyance seat in which a cushion material is placed on a back frame serving as a skeleton of a backrest portion and is covered with a skin material, wherein the back frame includes right and left side frames which constitute side portions in a seat width direction and extend in an up to down direction, wherein a skin pull-in groove for pulling an end of the skin material is formed on a surface of a cushion front portion disposed on a seat front side in relation to the back frame in the cushion material, wherein a back surface of the cushion front portion is provided with a slit-shaped back surface groove which is disposed on the outside of the skin pull-in groove in the seat width direction and extends in the up to down direction, and wherein a portion located on the outside of the back surface groove in the seat width direction of the cushion front portion is disposed at a position overlapping the side frame in a front to back direction of the seat.

As described above, since the slit-shaped back surface groove is formed at a position on the outside of the skin pull-in groove in the seat width direction of the cushion front portion and the portion located on the outside of the back surface groove is disposed at a position overlapping the side frame in the front to back direction of the seat, it is possible to realize a conveyance seat having a good seating feeling and a suitable shock absorbing structure at the time of a rear collision.

Specifically, it is generally preferable that the center portion of the seat back in the seat width direction softly receives the occupant and the side portions of the seat back firmly holds and receives the occupant in order to obtain a good seating feeling. With the above-described configuration, a good seating feeling can be obtained during normal use and the cushion material can be easily bent in a bellows shape from the outside toward the inside of the seat width direction at the time of a rear collision (when an excessive load is applied from behind).

At this time, when an occupant is seated on the conveyance seat, a surface of the side frame and a back surface of a portion located on the outside of the back surface groove in the seat width direction of the cushion front portion may come into contact with each other.

With the above-described configuration, a better seating feeling can be obtained during normal use and the cushion material can be easily bent at the time of a rear collision.

At this time, the back frame may include an upper frame which connects upper portions of the right and left side frames, a lower frame which connects lower portions of the right and left side frames, a connection wire which connects the upper frame and the lower frame to each other, and a plate-shaped occupant support member that is attached between the upper frame and the lower frame through the connection wire and supports a load from the seated occupant, and the back surface groove may be disposed on the outside of the connection wire in the seat width direction.

As described above, since the surface groove is disposed to avoid the connection wire having relatively high rigidity, the cushion material can be further suitably and easily bent at the time of a rear collision.

At this time, at least a part of the back surface groove extending in the up to down direction may be disposed at a position overlapping the side frame in the front to back direction of the seat.

Further, the back surface groove may be disposed to be aligned with the skin pull-in groove in the seat width direction.

With the above-described configuration, a better seating feeling can be obtained during normal use and the cushion material suitably extends in a bellows shape so that the cushion material can be easily bent at the time of a rear collision.

At this time, the skin pull-in groove may extend in the up to down direction, and the back surface groove may be disposed at a position overlapping an upper portion of the skin pull-in groove in the seat width direction and may be disposed at a position overlapping a lower portion of the skin pull-in groove in the up to down direction.

With the above-described configuration, since the back surface groove and the lower portion of the skin pull-in groove are arranged to extend linearly, the cushion material can be further easily bent at the time of a rear collision.

At this time, the back surface groove may extend in a substantially linear shape in the up to down direction.

With the above-described configuration, the cushion material can be suitably and easily bent at the time of a rear collision.

At this time, at least a part of the back surface groove extending in the up to down direction may be formed to be recessed toward a seat front side and to reach a center portion of the front to back direction of the seat in a portion provided with the back surface groove of the cushion front portion.

As described above, since the back surface groove is formed to a predetermined depth position, the cushion material can be suitably and easily opened so that the cushion material can be easily bent at the time of a rear collision.

Advantageous Effects of Invention

According to the present invention, it is possible to realize a conveyance seat having a good seating feeling and a shock absorbing structure at the time of a rear collision.

Specifically, it is generally preferable that the center portion of the seat back in the seat width direction softly receives the occupant and the side portions of the seat back firmly holds and receives the occupant in order to obtain a good seating feeling. With the above-described configuration, a good seating feeling can be obtained during normal use and the cushion material can be easily bent in a bellows shape from the outside toward the inside of the seat width direction at the time of a rear collision (when an excessive load is applied from behind).

Further, according to the invention, a better seating feeling can be obtained during normal use and the cushion material suitably extends in a bellows shape so that the cushion material can be easily bent at the time of a rear collision.

DESCRIPTION OF EMBODIMENTS

Hereinafter, an embodiment according to the present invention will be described with reference to FIGS. 1 to 7.

This embodiment relates to the invention of a conveyance seat in which a cushion material is placed on a back frame and is covered with a skin material, a back frame includes right and left side frames which constitute side portions in a seat width direction and extend in an up to down direction, a surface of the cushion material is provided with a skin pull-in groove for pulling an end of the skin material and a surface groove disposed on the outside of the skin pull-in groove in a seat width direction and extending in an up to down direction, a back surface of the cushion material is provided with a back surface groove disposed between the skin pull-in groove and the surface groove in the seat width direction and extending in the up to down direction, and the surface groove is disposed at a position overlapping the side frame in a front to back direction of the seat.

Additionally, a side on which an occupant sits with respect to a seat back of the conveyance seat is a seat front side.

Figure 1:
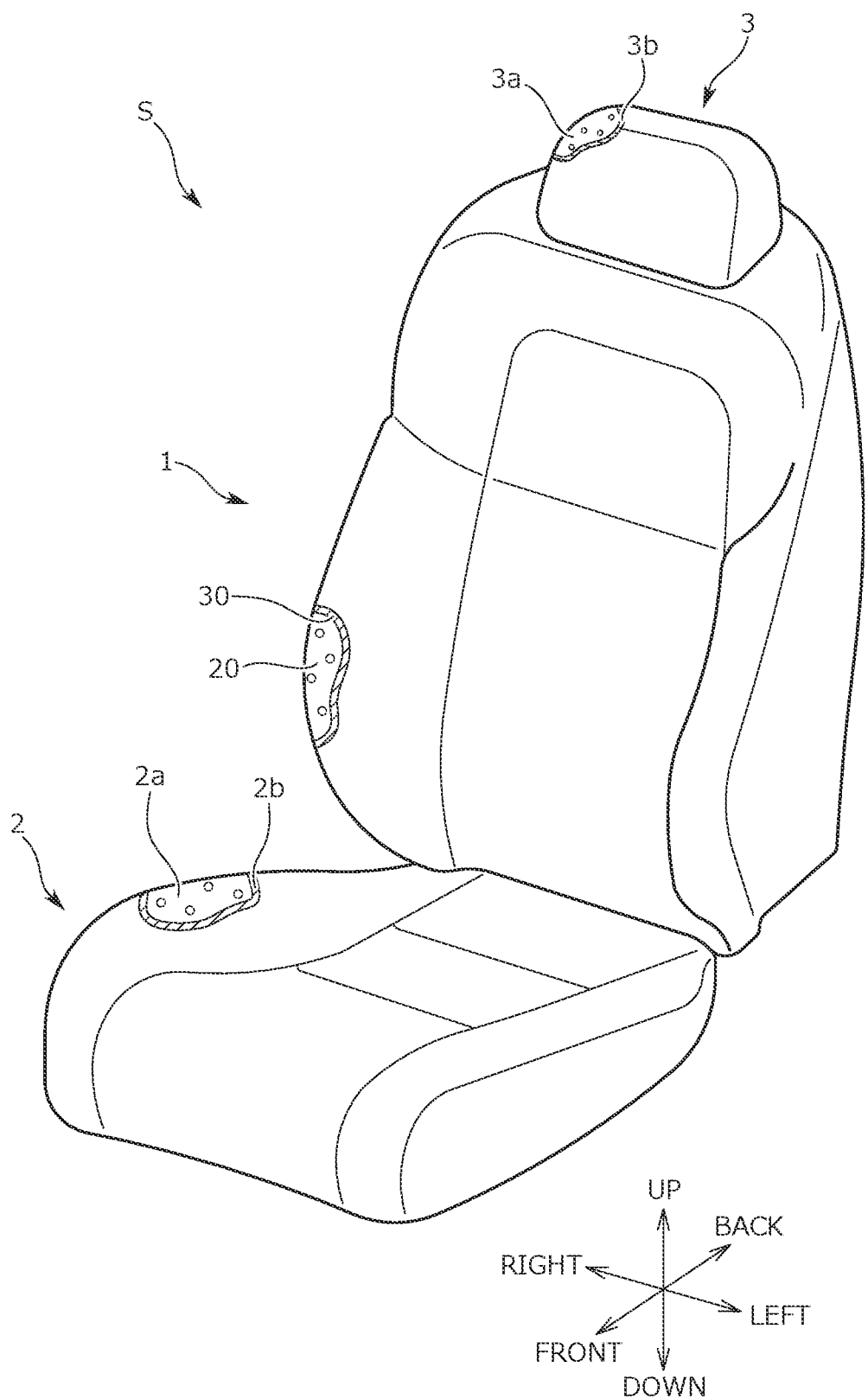
FIG. 1 is an external perspective view of a conveyance seat according to the present invention.

A conveyance seat S of this embodiment mainly includes, as shown in FIG. 1, a seat back 1, a seat cushion 2 which is connected to a lower portion of the seat back 1, and a headrest 3 which is connected to an upper portion of the seat back 1.

Figure 2:
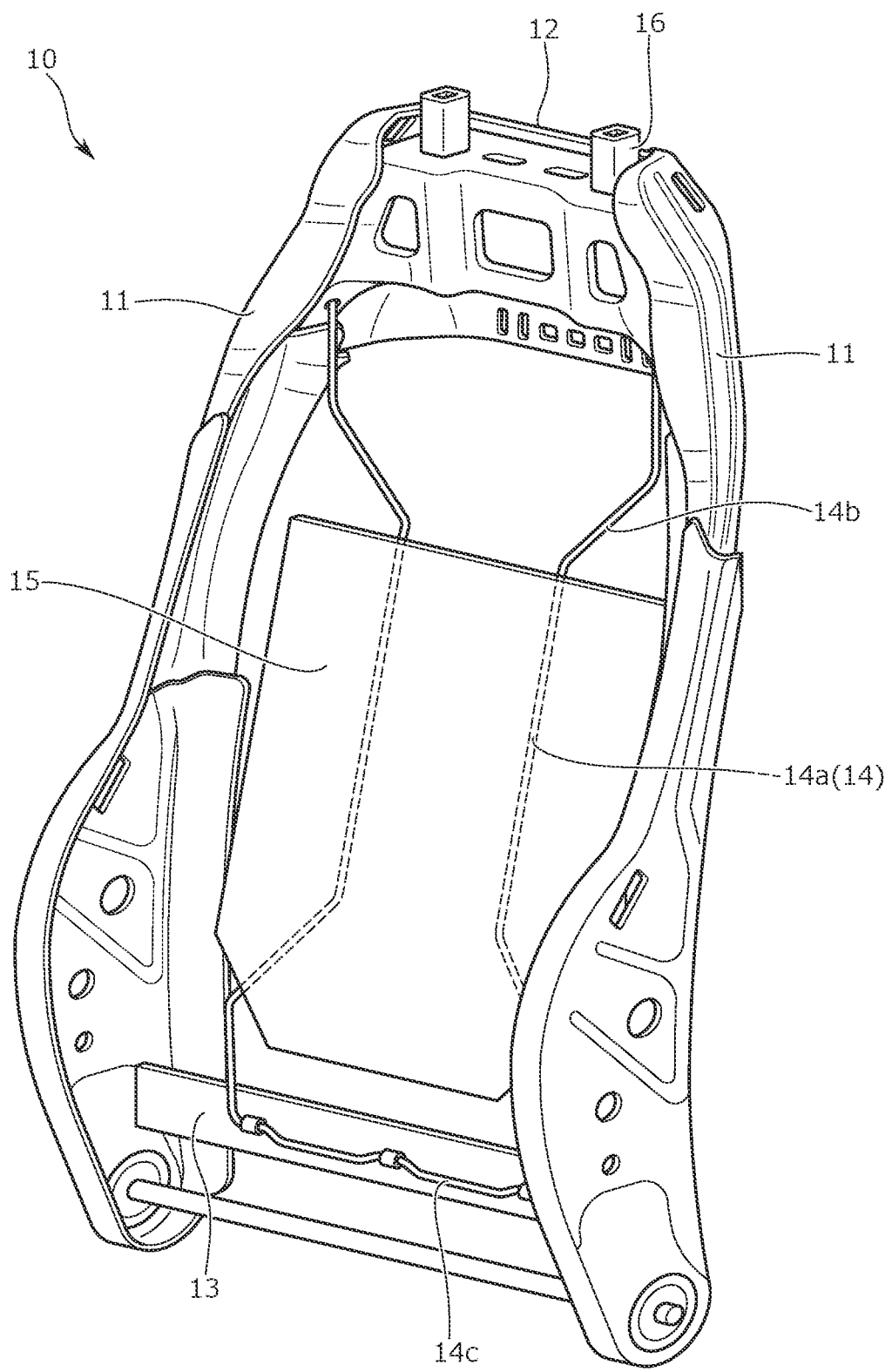
FIG. 2 is a perspective view of a back frame which is a skeleton of a seat back.
Figure 3:
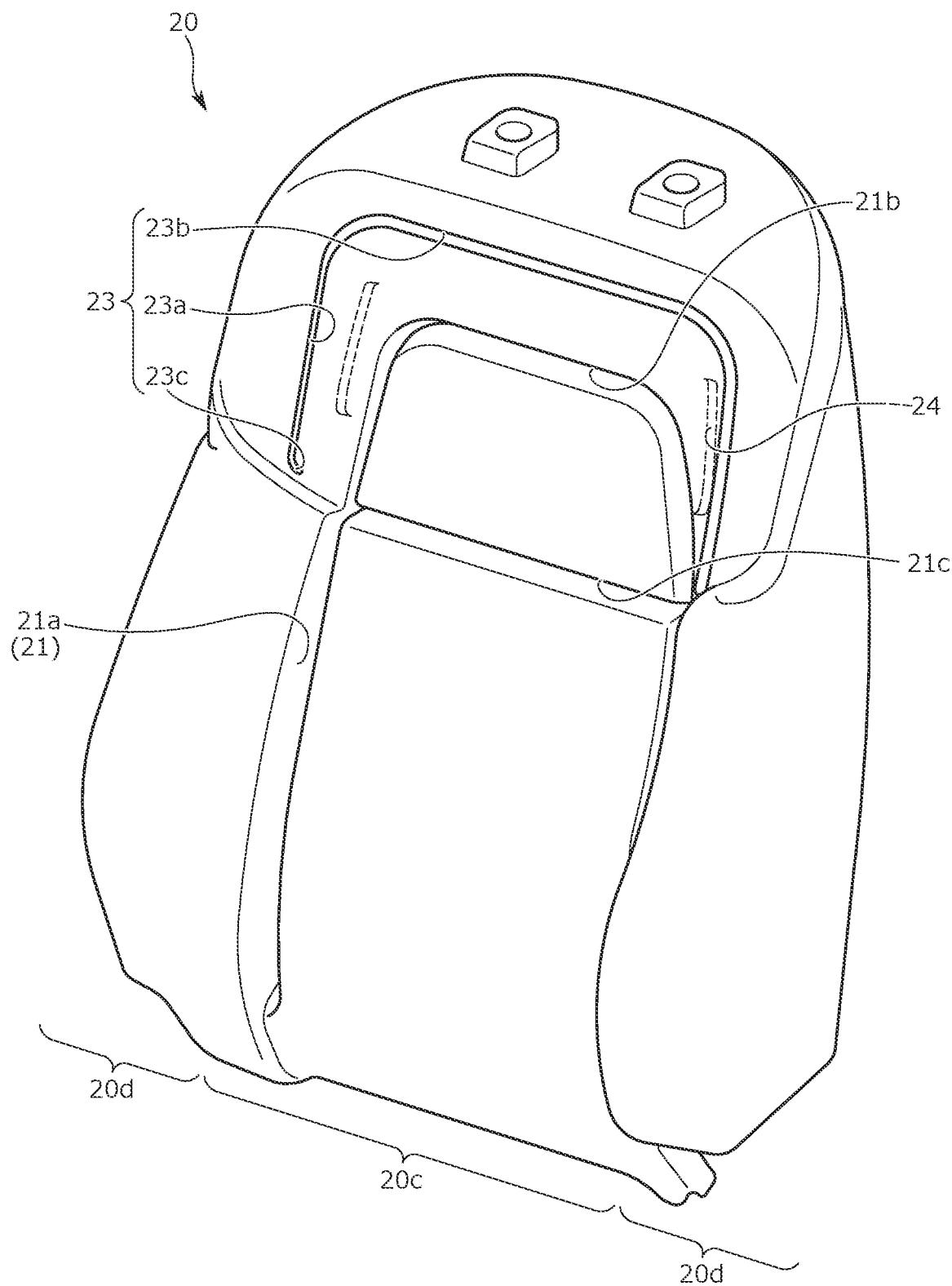
FIG. 3 is a perspective view of a cushion material of the seat back.

As shown in FIG. 1, the seat back 1 is a backrest portion which supports the back of the occupant from behind and has a configuration in which a cushion material 20 shown in FIG. 3 is placed on a back frame 10 serving as a skeleton and shown in FIG. 2 and is covered with a skin material 30.

The seat cushion 2 is a seating portion which supports the occupant from below and has a configuration in which a cushion material 2a is placed on a cushion frame (not shown) serving as a skeleton and is covered with a skin material 2b from above the cushion material 2a.

The headrest 3 is a head portion which supports the head of the occupant from behind and has a configuration in which a cushion material 3a is placed on a headrest pillar (not shown) serving as a core material and is covered with a skin material 3b.

As shown in FIG. 2, the back frame 10 mainly includes right and left side frames 11 which are composed of a substantially rectangular frame-shaped body, are arranged laterally in the seat width direction, and extend in the up to down direction, an upper frame 12 which connects the upper end portions of the right and left side frames 11, a lower frame 13 which connects the lower end portions of the right and left side frames 11 and has a substantial plate shape, a connection wire 14 which connects the upper frame 12 and the lower frame 13, and a plate-shaped occupant support member 15 which is attached between the upper frame 12 and the lower frame 13 through the connection wire 14 and supports the load of the seated occupant.

The side frames 11 are metal plate members having a substantially U-shaped cross-section and are arranged to face each other in the seat width direction.

The upper end portions of the right and left side frames 11 are connected to the upper frame 12 by welding with the upper frame 12 sandwiched therebetween in the front to back direction of the seat.

Further, the lower end portions of the right and left side frames 11 are connected to the lower frame 13 by welding.

A pair of headrest guides 16 for supporting a headrest pillar (not shown) is attached to a front surface of a center portion of the upper frame 12 in the seat width direction with a predetermined gap therebetween in the seat width direction.

The connection wire 14 is a wire member for supporting the occupant support member 15, is bridged over each of the upper frame 12 and the lower frame 13, and is disposed in pairs to be symmetrical with respect to the center line in the seat width direction of the back frame 10.

The right and left connection wires 14 include a wire body portion 14a which is attached to the back surface of the occupant support member 15 and extends in a substantially linear shape in the up to down direction, a wire upper portion 14b which extends upward from the upper end portion of the wire body portion 14a while continuously extending outward in the seat width direction and is hooked to a hooking hole provided on the bottom surface of the upper frame 12, and a wire lower portion 14c which continuously extends downward from the lower end portion of the wire body portion 14a and is hooked to a hooking portion provided on the front surface of the lower frame 13.

The occupant support member 15 is a substantially rectangular plate-shaped member formed of a resin material or the like and is attached to be movable backward with respect to the upper frame 12 and the lower frame 13.

Further, the occupant support member 15 is disposed at a position closer to the lower frame 13 than the upper frame 12 in the up to down direction. Therefore, when the rear surface of the vehicle collides, particularly the upper body portion on the head side in the upper body of the occupant tends to sink into the seat back 1.

Figure 4:
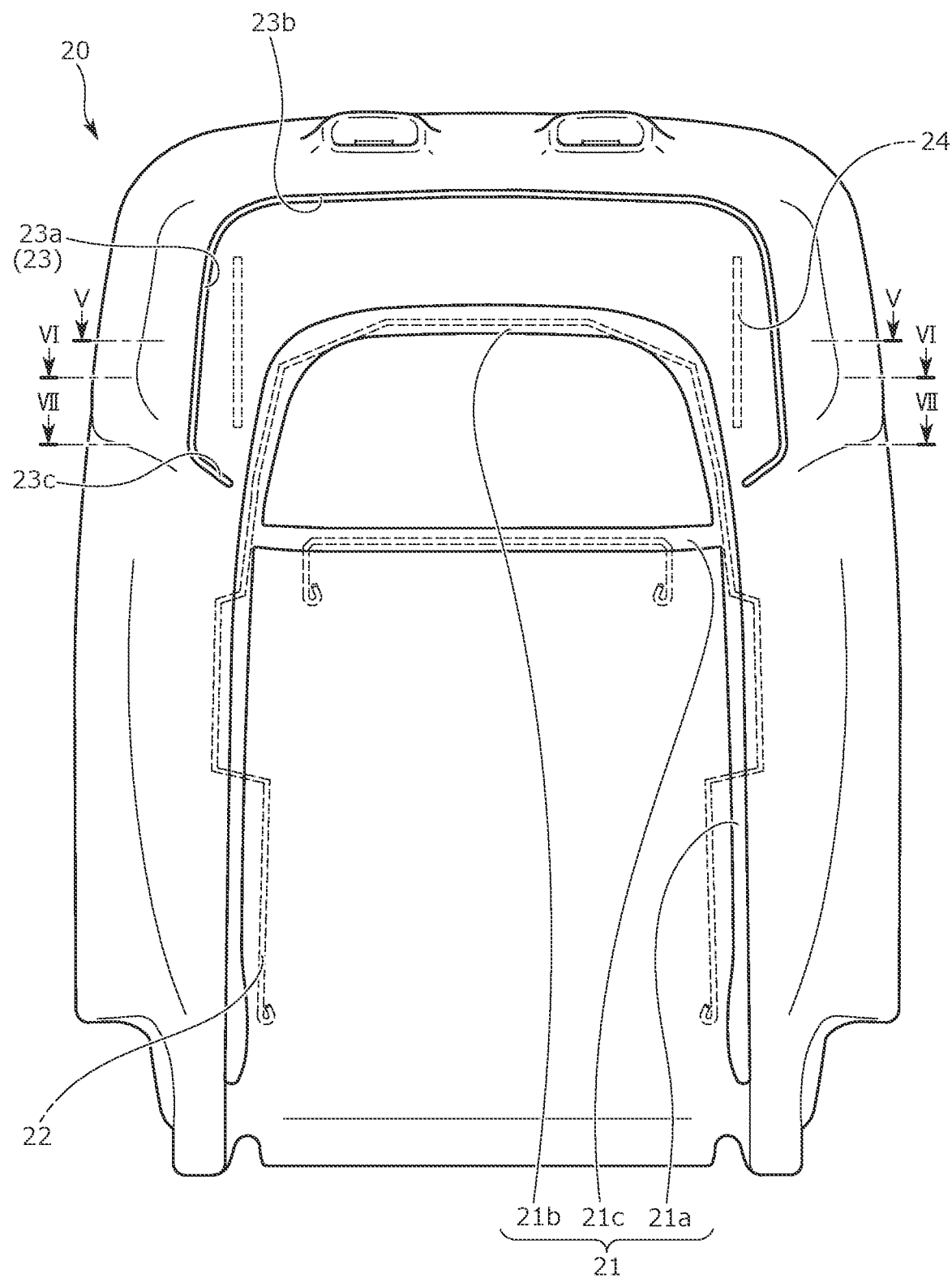
FIG. 4 is a front view of the cushion material of the seat back.

As shown in FIGS. 3 and 4, the cushion material 20 is formed of a resin material such as urethane foam and the seat surface (front surface) of the cushion material 20 is provided with a skin pull-in groove 21 for pulling the end of the skin material 30 shown in FIG. 1 and a slit-shaped surface groove 23 disposed above the skin pull-in groove 21.

Figure 5:
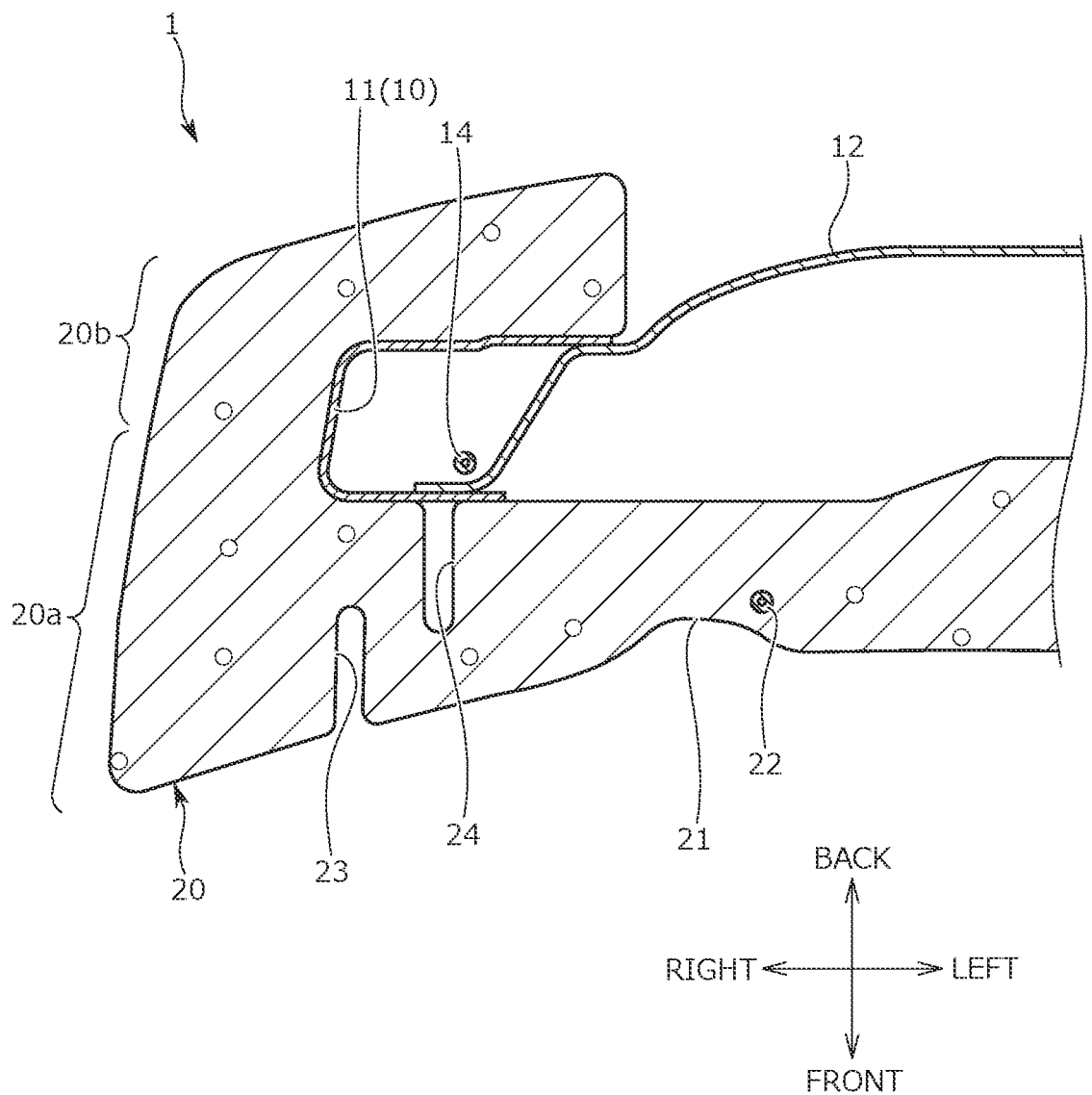
FIG. 5 is a cross-sectional view taken along a line V-V of FIG. 4 and is a view showing a positional relationship between a surface groove and a back surface groove.

Further, a back surface of a cushion front portion 20a shown in FIG. 5 and disposed on the seat front side in relation to the back frame 10 in the cushion material 20 is provided with a slit-shaped back surface groove 24 which is disposed between the skin pull-in groove 21 and the surface groove 23 in the seat width direction and extends in the up to down direction.

The skin pull-in groove 21 is a substantially inverted U-shaped groove when viewed from the front side and is formed to be recessed toward the seat rear side with respect to the surface of the cushion material 20.

The skin pull-in groove 21 mainly includes right and left pull-in groove side portions 21a which are formed on the surface of the cushion material 20 with a predetermined gap therebetween in the seat width direction and extend in the up to down direction, a pull-in groove upper portion 21b which extends in the seat width direction to connect the upper end portions of the right and left pull-in groove side portions 21a, and a pull-in groove center portion 21c which extends in the seat width direction to connect the right and left pull-in groove side portions 21a at the substantial center portion of the cushion material 20 in the up to down direction.

As shown in FIG. 4, an insert wire 22 having a long, substantially circular cross-section is embedded at a position corresponding to the skin pull-in groove 21 inside the cushion material 20 (a position adjacent to the skin pull-in groove 21).

The insert wire 22 is a wire formed of a known metal material or hard resin material and extends along the skin pull-in groove 21. A C-ring having a long, substantially C-shaped cross-section (not shown) provided at the terminal portion of the skin material 30 is hooked to the insert wire 22. With the configuration, the skin material 30 is fixed to the cushion material 20.

As shown in FIGS. 3 and 4, the surface groove 23 is a substantially inverted U-shaped groove when viewed from the front side and is formed to adjust the flexibility and the bending direction of the cushion material 20.

The surface groove 23 includes right and left surface groove side portions 23a which are formed on the right and left outer sides of the seat width direction in relation to the skin pull-in groove 21 on the surface of the cushion material 20 and extend in the up to down direction, a surface groove upper portion 23b which extends in the seat width direction to connect the upper end portions of the right and left surface groove side portions 23a, and right and left surface groove lower portions 23c which are respectively continuous from the lower end portions of the right and left surface groove side portions 23a and extend downward while being inclined inward in the seat width direction.

The right and left surface groove side portions 23a extend in a substantially linear shape to be inclined inward in the seat width direction as it goes from the lower side to the upper side of the cushion material 20. In other words, the right and left surface groove side portions are inclined upward on the inside of the seat width direction to approach the headrest 3. Further, the right and left surface groove side portions are arranged at the intermediate portion between the outer end portion of the cushion material 20 and the skin pull-in groove 21 in the seat width direction.

The right and left surface groove lower portions 23c extend downward while being inclined inward in the seat width direction to approach the skin pull-in groove 21 (particularly, the pull-in groove center portion 21c) as it goes from the upper side to the lower side of the cushion material 20.

Additionally, a predetermined gap is provided between the surface groove lower portion 23c and the skin pull-in groove 21 in order to ensure the rigidity of the cushion material 20.

As shown in FIGS. 3 and 4, the back surface groove 24 is a groove which is formed to adjust the flexibility and the bending direction of the cushion material 20 together with the surface groove 23 and extends in a substantially linear shape in the up to down direction.

The back surface groove 24 is formed pairs on the right and left sides with a predetermined gap therebetween in the seat width direction and extends in the up to down direction to be aligned with the right and left surface groove side portions 23a.

Further, the right and left back surface grooves 24 are arranged at a position overlapping the right and left pull-in groove side portion 21a of the skin pull-in groove 21 in the up to down direction and are arranged at a position (equivalent height position) overlapping the pull-in groove upper portion 21b in the seat width direction.

Specifically, the right and left back surface grooves 24 are arranged to be aligned with the right and left pull-in groove side portions 21a in the up to down direction and are arranged to be aligned with the pull-in groove upper portion 21b in the seat width direction.

Additionally, a predetermined gap is provided between the back surface groove 24 and the skin pull-in groove 21 in order to ensure the rigidity of the cushion material 20.

Figure 6:
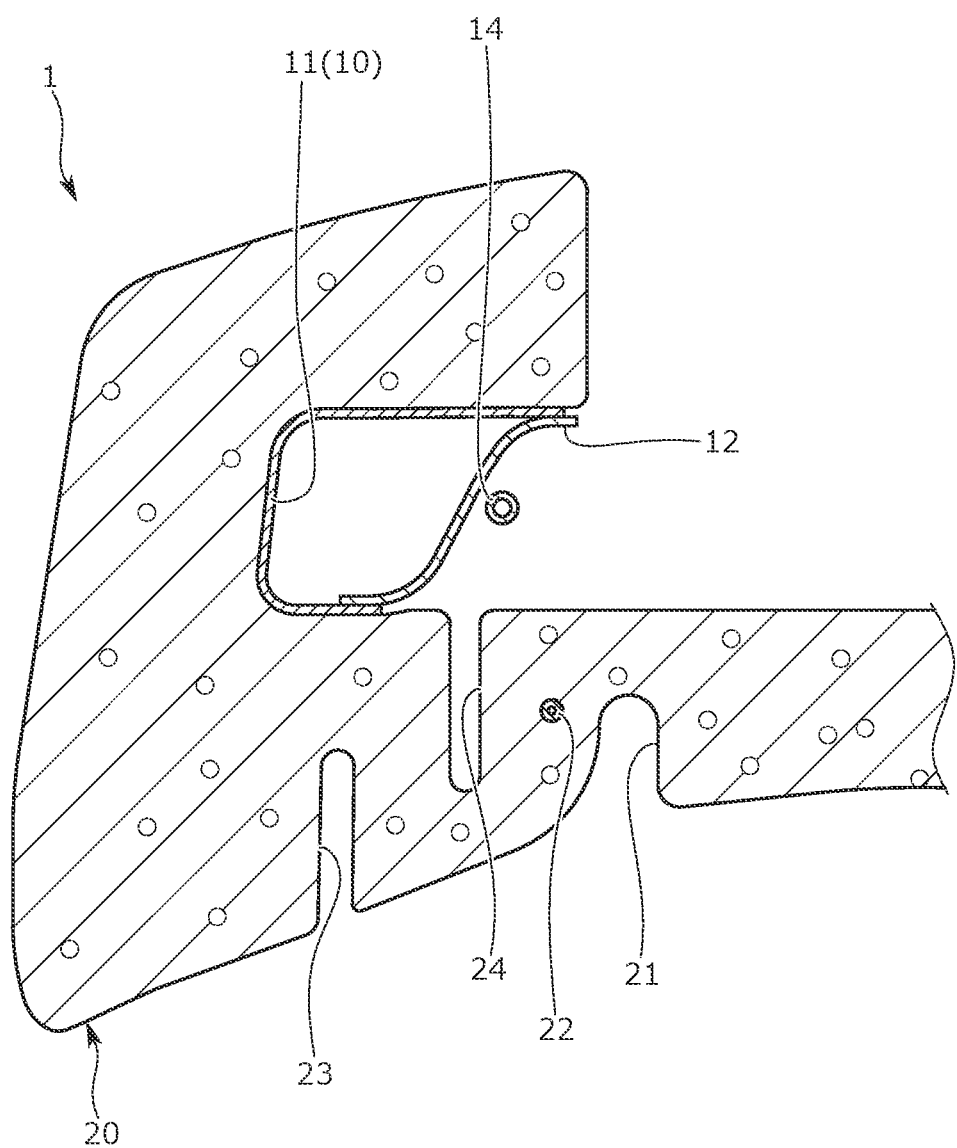
FIG. 6 is a cross-sectional view taken along a line VI-VI of FIG. 4.
Figure 7:
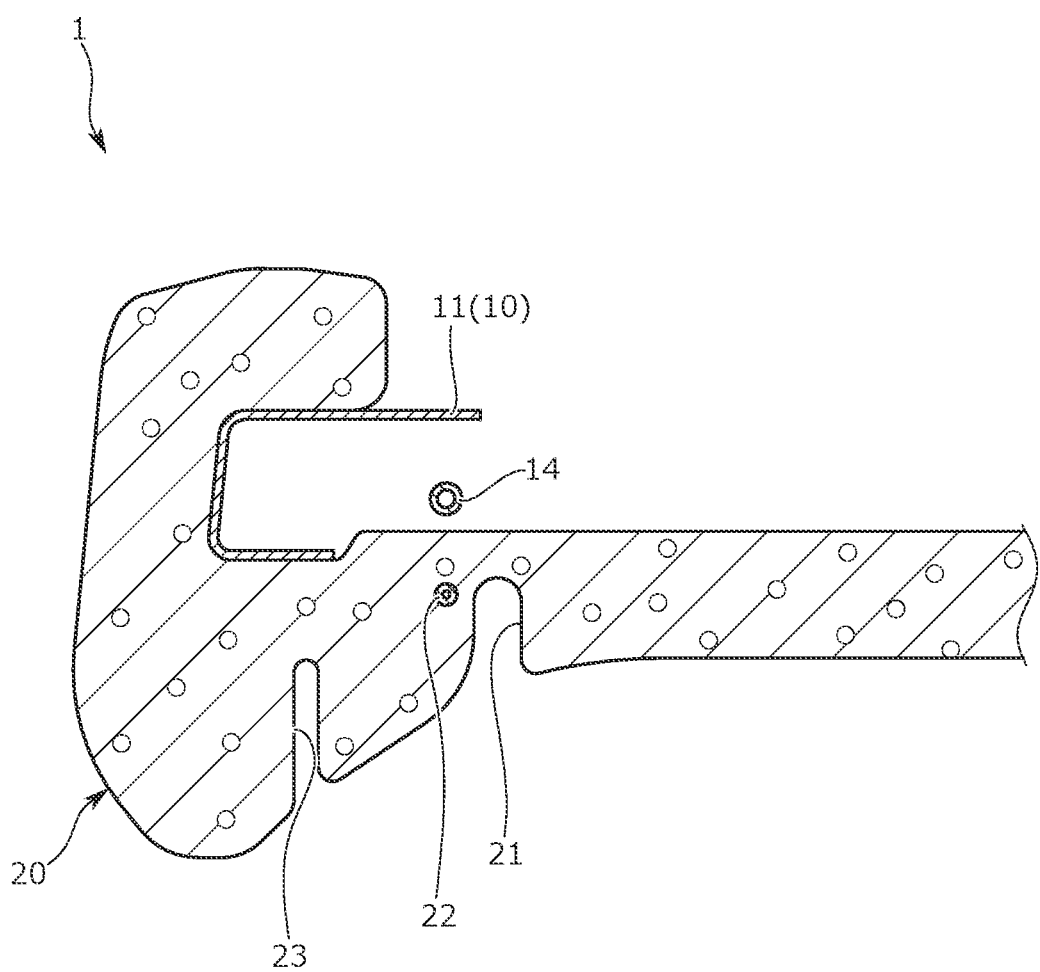
FIG. 7 is a cross-sectional view taken along a line VII-VII of FIG. 4.

As shown in FIGS. 5 to 7, the surface groove 23 (surface groove side portion 23a) is disposed at a position overlapping the side frame 11 in the front to back direction of the seat and is disposed in a range in which the back surface of the cushion material 20 comes into contact with the front surface of the side frame 11 in the seat width direction.

The same applies to the back surface groove 24. As shown in FIGS. 5 and 6, at least a part of the back surface groove 24 extending in the up to down direction is disposed at a position overlapping the side frame 11 in the front to back direction of the seat and is disposed in a range in which the back surface of the cushion material 20 comes into contact with the front surface of the side frame 11 in the seat width direction.

Therefore, since particularly a portion provided with the surface groove 23 and the back surface groove 24 in the cushion material 20 (cushion front portion 20a) is suitably supported by the back frame 10 during normal use, a good seating feeling can be provided.

On the other hand, since particularly a portion provided with the surface groove 23 and the back surface groove 24 in the cushion material 20 extends in a bellows shape from the outer front side toward the inner rear side in the seat width direction to be easily bent at the time of a rear collision, the upper body of the occupant can suitably sink into the seat back 1.

As shown in FIG. 5, the surface groove 23 is disposed at a position overlapping a portion in which the side frame 11 and the upper frame 12 are assembled to form a closed cross-section in the front to back direction of the seat.

Further, as shown in FIG. 6, the surface groove 23 and the back surface groove 24 are arranged at a position overlapping a portion, in which the side frame 11 and the upper frame 12 overlap each other in the front to back direction of the seat, in the front to back direction of the seat.

Therefore, since particularly a portion provided with the surface groove 23 and the back surface groove 24 in the cushion material 20 is suitably supported by the back frame 10 during normal use, a good seating feeling can be provided.

As shown in FIG. 6, the front surface of the upper frame 12 located at a position corresponding to the surface groove 23 and the back surface groove 24 extends from the outside toward the inside of the seat width direction while being inclined backward.

Specifically, the front surface of the upper frame 12 extends from the outside toward the inside of the seat width direction while coming into contact with the back surface of the cushion material 20 at a position facing the surface groove 23. Then, the front surface extends from the outside toward the inside of the seat width direction while being inclined backward to be separated from the back surface of the cushion material 20 at a position facing the back surface groove 24.

Therefore, at the time of a rear collision, particularly a portion provided with the surface groove 23 and the back surface groove 24 in the cushion material 20 easily extends in a bellows shape from the outer front side toward the inner rear side of the seat width direction and can be easily bent.

As shown in FIGS. 4 to 6, the surface groove 23 (surface groove side portion 23a) and the back surface groove 24 are arranged at a position (equivalent height position) overlapping the skin pull-in groove 21 in the seat width direction. Specifically, these grooves are arranged at a position overlapping the upper portion of the pull-in groove side portion 21a and the pull-in groove upper portion 21b of the skin pull-in groove 21 in the seat width direction.

Therefore, at the time of a rear collision, particularly a portion provided with the surface groove 23 and the back surface groove 24 in the cushion material 20 easily extends in a bellows shape to be easily bent.

As shown in FIGS. 5 and 6, the groove depth of the surface groove 23 (surface groove side portion 23a) is formed to reach the seat rear side in relation to the center portion supporting the backrest portion of the seated occupant in the front surface of the cushion material 20, in other words, a portion facing a portion in which the occupant support member 15 is disposed.

Further, the surface groove 23 is formed to be recessed toward the seat rear side and reach a center portion of a portion provided with the surface groove 23 of the cushion material 20 in the front to back direction of the seat.

The groove depth of the back surface groove 24 is formed to reach the seat front side in relation to a portion supporting the backrest portion of the seated occupant in the back surface of the cushion material 20, in other words, a portion facing a portion in which the occupant support member 15 is disposed.

Further, the back surface groove 24 is formed to be recessed toward the seat front side and reach a center portion of a portion provided with the back surface groove 24 of the cushion material 20 in the front to back direction of the seat.

That is, the groove bottom portion of the surface groove 23 of the cushion material 20 is disposed to face the groove bottom portion of the back surface groove 24 and when the horizontal cross-section shown in FIGS. 5 and 6 is viewed from above, the horizontal cross-section of the cushion material 20 is formed in a zigzag shape.

Therefore, at the time of a rear collision, particularly a portion provided with the surface groove 23 and the back surface groove 24 in the cushion material 20 further easily extends in a bellows shape to be easily bent.

As shown in FIGS. 5 and 6, the surface groove 23 (surface groove side portion 23a) and the back surface groove 24 are arranged on the outside of the seat width direction in relation to the connection wire 14 and are arranged on the outside of the seat width direction in relation to the insert wire 22.

As described above, since the surface groove 23 and the back surface groove 24 are arranged to avoid the connection wire 14 and the insert wire 22 having relatively high rigidity, the cushion material 20 can be more suitably bent at the time of a rear collision.

Other Embodiments

In the above-described embodiment, since the cushion material 20 is formed of a resin material such as urethane foam, it is preferable that the cushion side portion 20d has a higher hardness than the cushion center portion 20c when the inner portion of the surface groove 23 is a cushion center portion 20c and the outer portion of the surface groove 23 is a cushion side portion 20d in the seat width direction as shown in FIG. 3.

With the above-described configuration, the cushion center portion 20c can softly receive the seated occupant and the cushion side portion 20d can firmly hold and receive the occupant.

In order to mold the cushion material 20 so that the hardness is partially different, a known technique such as using a different urethane material can be adopted.

In the above-described embodiment, as shown in FIGS. 5 to 7, since the back surface of the portion provided with the surface groove 23 (surface groove side portion 23a) of the cushion material 20 comes into contact with the surface of the side frame 11, this can be changed without particular limitation.

That is, when the occupant is seated on the conveyance seat S, the back surface of the portion provided with the surface groove 23 in the cushion material 20 may come into contact with the surface of the side frame 11. On the other hand, when the occupant is not seated, these surfaces may not in contact with each other (may be close to each other).

In the above-described embodiment, as shown in FIGS. 5 to 7, since a portion located on the outside of the back surface groove 24 of the cushion material 20 in the seat width direction is disposed at a position overlapping the side frame 11 in the front to back direction of the seat and is configured to come into contact with the surface of the side frame 11, these can be changed without particular limitation.

That is, when the occupant is seated on the conveyance seat S, the back surface of the portion located on the outside of the back surface groove 24 of the cushion material 20 in the seat width direction may come into contact with the surface of the side frame 11. On the other hand, when the occupant is not seated, the surfaces may not be in contact with each other (may be close to each other).

In the above-described embodiment, as shown in FIG. 5, the back surface groove 24 is disposed between the skin pull-in groove 21 and the surface groove 23 in the seat width direction. This can be changed without particular limitation and the back surface groove may be disposed on the outside of the skin pull-in groove 21 and the surface groove 23 in the seat width direction.

Even in the above-described configuration, at the time of a rear collision, the cushion material 20 extends in a bellows shape from the outside to the inside in the seat width direction, so that the cushion material 20 can be easily bent.

In the above-described embodiment, as a specific example, the vehicle seats used in automobiles have been described, but the seats are not particularly limited and can be used not only as vehicle seats for trains and buses, but also as vehicle seats for airplanes and ships.

In this embodiment, the conveyance seat according to the present invention has been mainly described.

However, the above-described embodiment is merely an example for facilitating the understanding of the present invention, and does not limit the present invention. The present invention can be modified and improved without departing from the spirit thereof, and it goes without saying that the present invention includes an equivalent thereof.

In particular, the arrangement and configuration of the skin pull-in groove, the front surface groove, and the back surface groove of the cushion material described in the above-described embodiment are merely examples, and do not limit the present invention.

REFERENCE SIGNS LIST

S: conveyance seat
1: seat back
2: seat cushion
2a, 3a: cushion material
2b, 3b: skin material
3: headrest
10: back frame
11: side frame
12: upper frame
13: lower frame
14: connection wire
14a: wire body portion
14b: wire upper portion
14c: wire lower portion
15: occupant support member
16: headrest guide
20: cushion material
20a: cushion front portion
20b: cushion rear portion
20c: cushion center portion
20d: cushion side portion
21: skin pull-in groove
21a: pull-in groove side portion
21b: pull-in groove upper portion
21c: pull-in groove center portion
22: insert wire
23: surface groove
23a: surface groove side portion
23b: surface groove upper portion
23c: surface groove lower portion
24: back surface groove
30: skin material

The invention claimed is:

1. A conveyance seat comprising a back frame, a cushion material placed on the back frame and a skin material covering the back frame and the cushion material,
wherein the back frame includes right and left side frames which constitute side portions in a seat width direction and extend in an up to down direction,
wherein a skin pull-in groove for pulling an end of the skin material is formed on a surface of a cushion front portion disposed on a seat front side in relation to the back frame in the cushion material,
wherein a back surface of the cushion front portion is provided with a slit-shaped back surface groove which is disposed on an outside of the skin pull-in groove in the seat width direction and extends in the up to down direction,
wherein a portion located on an outside of the slit-shaped back surface groove in the seat width direction of the cushion front portion is disposed at a position overlapping the right and left side frames in a front to back direction of the conveyance seat,
wherein the skin pull-in groove extends in the up to down direction,
wherein an insert wire extending along the skin pull-in groove is provided inside the cushion material,
wherein the slit-shaped back surface groove, an upper portion of the skin pull-in groove and an upper portion of the insert wire are disposed at a same position in the front to back direction, and
wherein the insert wire is disposed between the slit-shaped back surface groove and the skin pull-in groove in the seat width direction.

2. The conveyance seat according to claim 1,
wherein when an occupant is seated on the conveyance seat, a surface of the right and left side frames and a back surface of a portion located on the outside of the slit-shaped back surface groove in the seat width direction of the cushion front portion come into contact with each other.

3. The conveyance seat according to claim 1,
wherein the back frame includes an upper frame which connects upper portions of the right and left side frames, a lower frame which connects lower portions of the right and left side frames, a connection wire which connects the upper frame and the lower frame to each other, and a plate-shaped occupant support member that is attached between the upper frame and the lower frame through the connection wire and supports a load from a seated occupant, and
wherein the slit-shaped back surface groove is disposed on an outside of the connection wire in the seat width direction.

4. The conveyance seat according to claim 1,
wherein at least a part of the slit-shaped back surface groove extending in the up to down direction is disposed at a position overlapping the right and left side frames in the front to back direction of the conveyance seat.

5. The conveyance seat according to claim 1,
wherein the skin pull-in groove extends in the up to down direction, and
wherein the slit-shaped back surface groove is disposed at a position overlapping an upper portion of the skin pull-in groove in the seat width direction and is disposed at a position overlapping a lower portion of the skin pull-in groove in the up to down direction.

6. The conveyance seat according to claim 1,
wherein the slit-shaped back surface groove extends in a substantially linear shape in the up to down direction.

7. The conveyance seat according to claim 1,
wherein at least a part of the slit-shaped back surface groove extending in the up to down direction is formed to be recessed toward the seat front side and to reach a center portion of the front to back direction of the conveyance seat in a portion provided with the slit-shaped back surface groove of the cushion front portion.

* * * * *